United States Patent Office 2,920,706
Patented Jan. 12, 1960

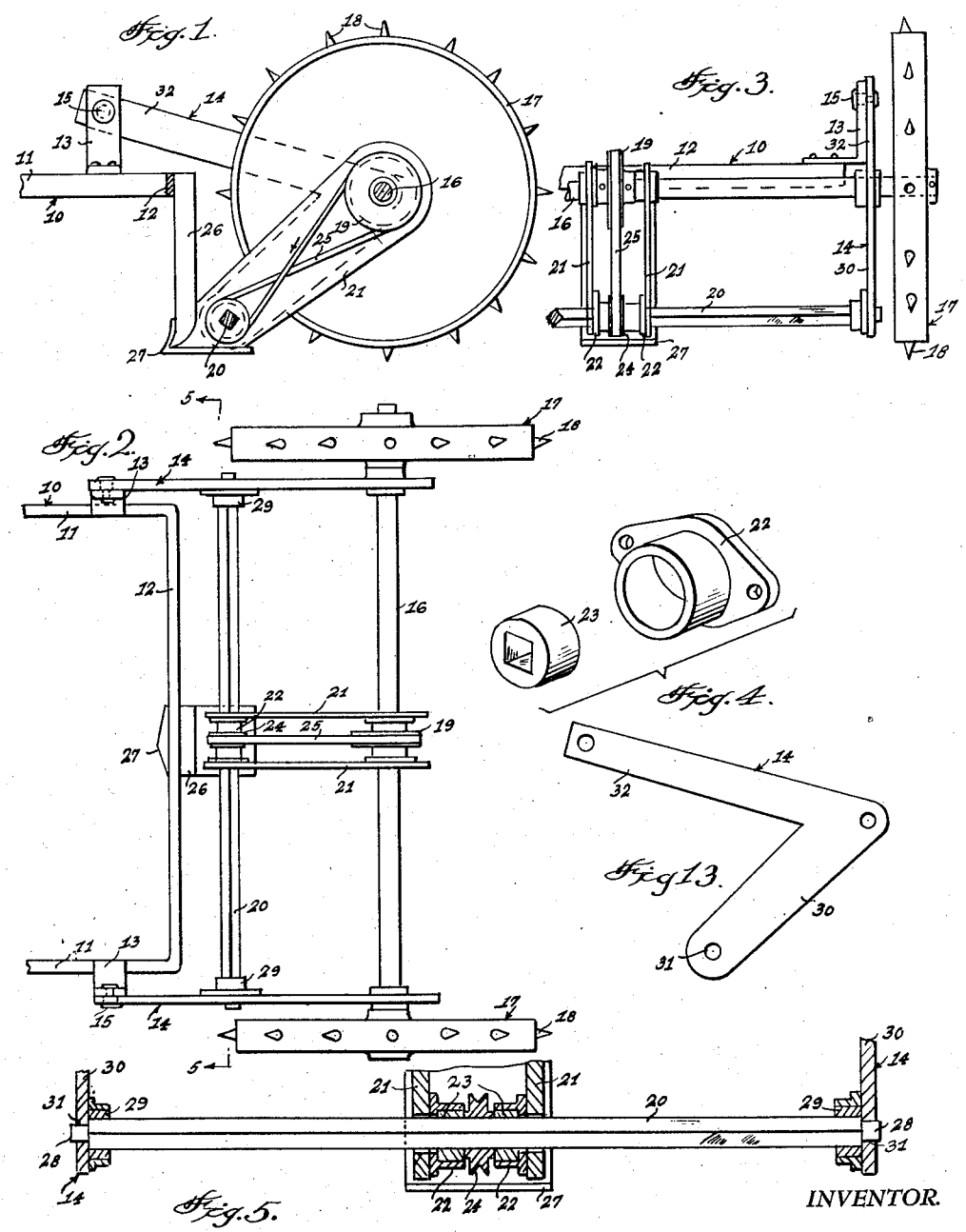

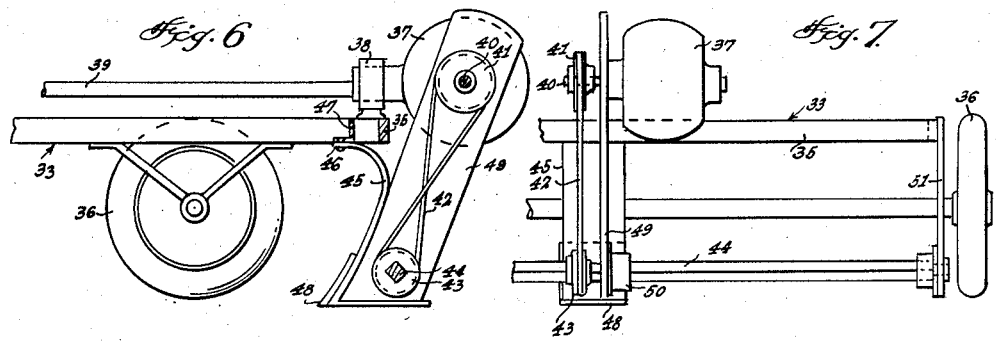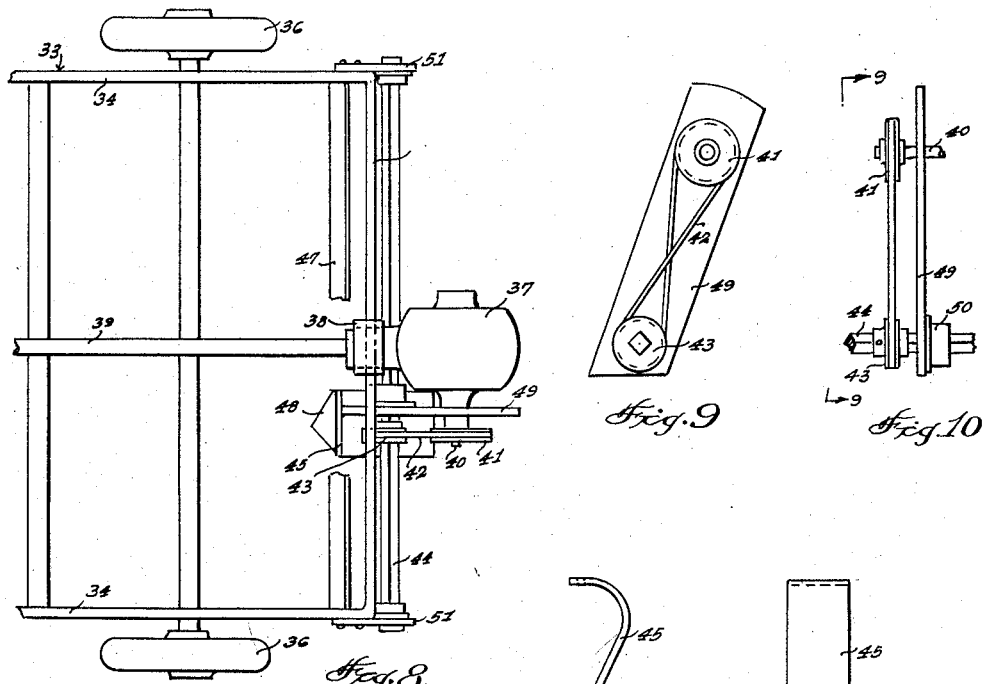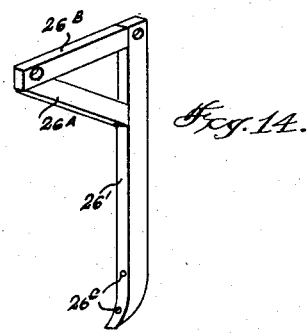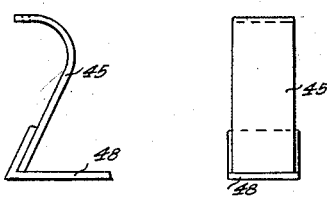

2,920,706
ROD WEEDER DRIVE
Frank W. Turner, New Raymer, Colo.
Application July 11, 1958, Serial No. 747,905
1 Claim. (Cl. 172—44)

This invention relates to agricultural equipment, and more particularly to a rod weeder drive.

The object of the invention is to provide an agricultural implement wherein there is provided a rod of rectangular formation which is adapted to be pulled along beneath the surface of the ground so that weeds, debris, or the like can be readily worked on whereby the ground can be placed in better condition for planting or growing of various types of crops, and wherein according to the present invention there is provided a novel drive for the weeder rod.

Another object of the invention is to provide an agricultural implement which includes a rectangular rod that is adapted to be rotated by means of a suitable power mechanism, so that the rod can be conveniently pulled along just below the surface of the ground so that weeds, stalks or the like can be readily dug up or chopped up or killed whereby the ground can be made ready for planting or cultivating, and wherein according to the present invention the weeder rod may be driven by means of ground engaging wheels, or else the weeder rod can be driven from a power take-off shaft which can be connected to a tractor or the like.

A further object of the invention is to provide a rod weeder drive which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary side elevational view illustrating the rod weeder drive of the present invention.

Figure 2 is a plan view of the assembly of Figure 1.

Figure 3 is a view illustrating certain constructional details of the assembly of Figures 1 and 2.

Figure 4 is a perspective view illustrating a bearing assembly.

Figure 5 is a sectional view taken on the line 5—5 of Figure 2.

Figure 6 is a fragmentary side elevational view illustrating a modification.

Figure 7 is a fragmentary end elevational view illustrating the assembly of Figure 6.

Figure 8 is a plan view of the assembly of Figures 6 and 7.

Figure 9 is a view illustrating the belt drive for the mechanism of Figures 6-8, and Figure 9 is taken on the line 9—9 of Figure 10.

Figure 10 is a view taken at right angles to the view shown in Figure 9.

Figure 11 is a side elevational view showing the shank and shoe for the assembly of Figures 6-8.

Figure 12 is a view taken at right angles to the view shown in Figure 11.

Figure 13 is an elevational view illustrating one of the V-shaped arms.

Figure 14 is a perspective view illustrating a modification.

Referring in detail to the drawings, and more particularly to Figures 1 through 5 of the drawings, the numeral 10 indicates a frame which includes spaced parallel side members 11 and an end member 12, Figure 2. Extending upwardly from each of the side members 11 and secured thereto is a bracket 13, and the numeral 14 indicates each of a pair of spaced parallel arms, and the arms 14 are secured to the brackets 13 as at 15. Supported by the rear of the arms 14 is a horizontally disposed axle 16, and the numeral 17 designates each of a pair of ground engaging wheels, and the wheels 17 are provided with a plurality of prongs or spikes 18 which help to increase traction. The frame 10 is adapted to be towed or pulled along behind a tractor, so that the wheels 17 will have their spikes 18 engage the ground so that these wheels 17 will be rotated, and these wheels 17 are secured in any suitable manner, as for example by means of a key to the axle 16 so that this axle 16 will be rotated due to the rotation of the wheels 17.

Mounted on the axle 16 and connected thereto or secured thereto in any suitable manner is a first pulley 19. The numeral 20 indicates a weeder bar which is adapted to be pulled along so that the weeder bar 20 travels just below the surface of the ground or soil whereby weeds, roots or the like will be dug up so that the ground can be effectively cultivated. The numeral 21 designates each of a pair of spaced parallel bars, and the bars 21 have their upper rear portions connected to the axle 16, there being support members 22 secured to the lower front portions of the bars 21. Bearings 23 are connected to the support members 22, and the bearings 23 have the weeder rod 20 extending therethrough. The numeral 24 indicates a second pulley which is mounted on the weeder rod 20, and an endless belt 25 is trained over the pulleys 19 and 24, a portion of the belt 25 being arranged in crisscross relation as shown in Figure 1.

Depending from the rear member 12 and secured thereto is a shank 26, and a shoe 27 is secured to the lower end of the shank 26. The shoe 27 is arranged forwardly of the pulley 24 so as to help protect the pulley 24 and its associated parts, whereby dirt, weeds or the like will be prevented from interfering with the operation of the mechanism.

As shown in Figure 5, trunnions 28 may be formed on the ends of the weeder rod 20, and the trunnions 28 can be journaled in the portions 30 of the arms 14. As shown in Figure 13 the arms 14 each have a substantial V-shape, so that the arms 14 include portions 30 and 32 which are arranged angularly with respect to each other. The portion 30 may be provided with an opening 31 through which one of the trunnions 28 can extend. The bearings 29 are arranged contiguous to the ends of the weeder rod 20 as shown in Figure 5.

Referring now to Figures 6 through 12 of the drawings, there is illustrated a modification wherein the numeral 33 indicates a frame which includes spaced parallel side members 34 and an end member 35. Wheels 36 support the frame 33, and the frame 33 is adapted to be towed or pulled along behind a tractor, truck or the like. Supported by the rear of the frame 33 is a differential 37, and the differential 37 may be secured in place by means of a clamp 38. The numeral 39 indicates a drive shaft which is connected to the differential 37, and the drive shaft 39 may be connected to a power take-off on the tractor or the like.

Extending outwardly from the differential 37 and driven thereby is a driven shaft 40, and the first pulley 41 is mounted on the driven shaft 40. The numeral 42 indicates an endless belt which is trained over the pulley 40, and a portion of the belt 42 is arranged in crisscross relation as shown in Figure 6. The belt 42 is also trained over a second pulley 43, and the pulley 43 is secured in any suitable manner as for example by means of a key arrangement to a weeder rod 44.

There is further provided a shank 45 which has its upper portion secured to a member 47 on the frame 33 in any suitable manner, as for example by means of a securing element 46. A shoe 48 is connected to the lower end of the shank 45, and the shoe 48 helps protect the pulley 43 and its associated parts from debris, foreign matter, dirt or the like.

The numeral 49 indicates a bar which has its upper end arranged so that the driven shaft 40 can extend therethrough, and the bar 49 provides a support for a bearing assembly 50 through which extends the weeder rod 44. The ends of the weeder rod 44 may be journaled in or supported by arms 51 which can be connected to the frame 33 in any suitable manner.

From the foregoing, it is apparent that there has been provided an agricultural device and referring to Figures 1 through 5 and Figure 13 for example, it will be seen that the frame 10 is adapted to be towed or pulled behind a suitable towing implement such as a tractor of conventional construction. With the parts arranged as shown in the drawings, it will be seen that as the frame 10 is pulled along the area being worked, the pair of wheels 17 will rotate due to the engagement of the prongs 18 with the ground. As the wheels 17 rotate, they turn the axle 16, and as the axle 16 rotates, it turns the pulley 19. The pulley 19 has the belt 25 trained thereover, and the belt 25 is also trained over the pulley 24 and with the pulley 24 secured or keyed to the weeder rod 20, it will be seen that the weeder rod 20 will be rotated. The weeder rod 20 is rectangular in cross section, and the weeder rod is arranged so that it will travel just below the upper surface of the ground so that weeds, foreign matter or the like will be effectively dug up or cut off whereby the ground can be properly cultivated preparatory to planting. Thus, the weeder rod 20 will be continually rotating due to the previously described belt drive and this will insure that the ground is properly prepared or worked. Furthermore, the shoe 27 is mounted on the lower end of the shank 26, and the shoe 27 offers protection for the various moving parts such as the pulley 24. The weeder rod 20 is supported by the bars 21 and the weeder rod 20 is further braced or supported by the V-shaped arms 14, one end of the arms 14 being connected to the brackets 13 as at 15. Suitable braces and bearings can be used wherever desired or required.

In Figures 6 through 12 there is illustrated a modification wherein the frame 33 is mounted on wheels 36, and the frame 33 is adapted to be towed along behind a tractor or the like or truck or other vehicle. The frame 33 provides a support for a differential 37 or gear housing 37, and the drive shaft 39 is connected to the diffential 37, and the drive shaft 39 is adapted to be connected to a suitable power mechanism such as the power take-off shaft of a tractor. The drive shaft 40 is rotated by the differential 37, and the shaft 40 has a pulley 41 thereon. A belt 42 is trained over the pulley 41, and the belt 42 which has portions thereof arranged in crisscross relation as shown in Figure 6, is also trained over the pulley 43 which is keyed or otherwise connected to the weeder rod 44. Thus, as the shaft 39 is rotated, the weeder rod 44 will be rotated and the weeder rod 44 is adapted to be used for cultivating the ground, cutting out weeds or the like. The shoe 48 helps protect parts such as the rotating pulley 43 from dirt or other foreign matter. The shoe 48 is mounted on the lower end of the shank 45, and the shank 45 is adapted to be connected to a brace 47 by means of a securing element 46. The weeder rod 44 is supported by arms 51 and a bar 49 helps support the weeder rod 44 and also helps to maintain the shoe 48 in its proper position.

It is known that the rod on a weeder turns backward and the provision of the belt such as the belt 25 or 42 which crisscrosses itself provides a more efficient drive than has been heretofore possible. The belt drive can be used with the ground engaging wheels 17 or with a power take-off mechanism as shown in Figure 6. The present invention eliminates the necessity of using universal joints, or the like. The belt drive of the present invention can be readily tightened so as to take up slack, and the parts can be made of any suitable material and in different shapes or sizes.

Referring to Figure 14, there is shown a shank 26' which functions in a manner similar to the previously described shank 26, and a brace 26A as well as a top piece 26B are associated with the shank 26'. The lower end of the shank 26' is provided with openings 26C whereby bolts or the like can be used for attaching a shoe such as a shoe 27 to the shank 26'.

Angle irons and braces can be used wherever desired and required. The arrangement shown in Figure 4 provides a stiff support and the parts can be made to fit various types of chisel plows or the like.

Minor changes in shape, size and rearrangement of details coming within the field of invention claimed may be resorted to in actual practice, if desired.

I claim:

In a device of the character described, a frame including spaced parallel side members and an end member, brackets extending upwardly from said side members and secured thereto, a pair of spaced parallel arms having portions thereof connected to said brackets, an axle supported by said arms, a pair of ground engaging wheels mounted on said axle, spikes connected to said wheels, a first pulley mounted on said axles, a weeder rod which is rectangular in cross section spaced forwardly and downwardly from said axle and said weeder rod being connected to portions of said arms, a pair of spaced parallel bars extending from said axle, support members secured to the front ends of said bars, bearings connected to said support members and said bearings engaging said weeder rod, a second pulley mounted on said weeder rod, a belt trained over said first and second pulleys, said belt having a portion thereof arranged in crisscross relation, a shank depending from said end member and secured thereto, and a shoe secured to the lower portion of the shank and said shoe being arranged forwardly of and contiguous to said second pulley.

References Cited in the file of this patent

UNITED STATES PATENTS

| | | |
|---|---|---|
| 1,338,204 | Wolfe | Apr. 27, 1920 |
| 2,596,270 | Miller et al. | May 13, 1952 |
| 2,601,653 | Wolfe | June 24, 1952 |
| 2,800,065 | Kropp | July 23, 1957 |
| 2,892,504 | Nowbray | June 30, 1959 |